United States Patent van Harskamp et al.

[11] Patent Number: 5,755,617
[45] Date of Patent: May 26, 1998

[54] METHOD AND DEVICE FOR SEPARATING AT LEAST ONE PIECE OF VISCERAL TISSUE FROM AT LEAST ONE ORGAN CONNECTED THERETO

[75] Inventors: Cornelis D. van Harskamp, Boxmeer; Adrianus J. van den Nieuwelaar, Gemert; Engelbert J. J. Teurlinx, Stevensbeek, all of Netherlands

[73] Assignee: Stork PMT B.V., Netherlands

[21] Appl. No.: 554,894

[22] Filed: Nov. 9, 1995

[30] Foreign Application Priority Data

Nov. 11, 1994 [NL] Netherlands ............... 9401887

[51] Int. Cl.$^6$ ................................. A22C 21/00
[52] U.S. Cl. ............... 452/106; 452/111; 452/116
[58] Field of Search ........................ 452/106, 111, 452/112, 117, 149, 128, 166, 185, 173, 116; 269/21, 287

[56] References Cited

U.S. PATENT DOCUMENTS

| | | | |
|---|---|---|---|
| 2,536,826 | 1/1951 | Taus | 452/173 |
| 2,637,066 | 5/1953 | Johnson | 452/173 |
| 2,832,989 | 5/1958 | Harris | 452/173 |
| 3,076,224 | 2/1963 | Walker | 452/116 |
| 3,112,518 | 12/1963 | Doggett et al. | |
| 4,102,014 | 7/1978 | Martin | 452/116 |
| 5,312,094 | 5/1994 | Zera | 269/21 |
| 5,318,428 | 6/1994 | Meyn | 452/106 |
| 5,439,205 | 8/1995 | Häberce | 269/21 |

FOREIGN PATENT DOCUMENTS

| | | | |
|---|---|---|---|
| 1 134 571 | 11/1982 | Canada | 17/9 |
| 0 482 700 A1 | 4/1992 | European Pat. Off. | A22C 21/06 |
| 57088 | 6/1991 | Germany | A22C 17/00 |
| 7811019 | 5/1980 | Netherlands | A22C 21/00 |
| 715768 | 9/1954 | United Kingdom | 28/2 |
| 2 004 175 | 3/1979 | United Kingdom | A22C 21/06 |

*Primary Examiner*—Willis Little
*Attorney, Agent, or Firm*—Kilpatrick Stockton LLP; John S. Pratt; Mitchell G. Stockwell

[57] ABSTRACT

In a method and device for separating at least one piece of visceral tissue from at least one organ connected thereto, in which the at least one piece of visceral tissue to be separated is smaller than said at least one organ, the cluster of visceral tissue and organ or organs is moved relative to and over a surface provided with holes. The holes are effectively at least as large as the smallest cross-section of the at least one piece of visceral tissue to be separated. A piece of visceral tissue to be separated which passes into a hole is retained in the hole.

32 Claims, 5 Drawing Sheets

METHOD AND DEVICE FOR SEPARATING AT LEAST ONE PIECE OF VISCERAL TISSUE FROM AT LEAST ONE ORGAN CONNECTED THERETO

This application claims priority to The Netherlands Application No. 9401887 filed on Nov. 11 1994.

BACKGROUND OF THE INVENTION

This invention relates to a method and device for separating at least one piece of visceral tissue from at least one organ connected thereto, in which the at least one piece of visceral tissue to be separated is smaller than said at least one organ. In the context of the invention the term "piece of visceral tissue" should be understood as meaning an organ, fatty tissue, a membrane or the like.

DISCUSSION OF THE PRIOR ART

Conventional methods for separating at least one piece of visceral tissue, such as an organ, from a cluster of organs comprise in the first place essentially manual methods in which the cluster is held in a specific orientation by hand or otherwise and each piece of visceral tissue to be separated is pulled off or cut off by hand. The separation is made in this way, for example, in connective tissue between organs. On the other hand, specific devices for carrying out specific separation operations are known from the prior art, in which devices in general a piece of visceral tissue is separated from a cluster of organs without human intervention.

SUMMARY OF THE INVENTION

The object of the invention is to provide a method for a specific large class of separation operations, namely those in which the at least one piece of visceral tissue to be separated is smaller than said at least one organ, which method permits a separation of the abovementioned type in a very simple and efficient way, and can easily be carried out either manually or mechanically in a fully automatic manner.

To this end, the method according to the invention is characterized in that the cluster of the at least one piece of visceral tissue and the at least one organ is moved relative to and over a surface which is provided with holes, which holes are effectively at least as large as the smallest cross-section of the at least one piece of visceral tissue to be separated, while a piece of visceral tissue to be separated which passes into a hole is retained in the hole. By moving the cluster of viscera, comprising the at least one piece of visceral tissue and the at least one organ, relative to the surface provided with holes, it is made possible for a piece of visceral tissue to be separated to pass into one of the holes, where it is then retained. The continuing movement of the at least one organ over the surface causes the piece of visceral tissue retained in the hole to break or tear off from the cluster of viscera at the position of the connection—which is assumed to be sufficiently weak—between the piece of visceral tissue to be separated and at least one organ.

In the method according to the invention it is important for the cluster of viscera and the surface to move relative to each other. In this case it is possible in principle to move the cluster of viscera manually or mechanically over a stationary surface, or to move both the surface and the cluster of viscera. However, an embodiment of the method according to the invention in which the cluster of viscera is placed on a surface which is moved in the direction of the plane thereof is preferable. In order to obtain the separation according to the invention, it can be ensured that the surface extends in the horizontal direction or at an angle thereto, and an external force (i.e. differing from the force of gravity) is exerted on the at least one organ, in order to make the at least one organ move relative to and over the surface. If the surface runs horizontally or slopes gently, the cluster of viscera will in principle be carried along by the surface in the direction of movement thereof through the friction between the cluster of viscera and the surface. By simply stopping the cluster of viscera in this situation and thus exerting an external force thereon, for example by means of a stopping element disposed in a fixed position above the surface, the cluster of viscera is set in motion relative to the surface, and the envisaged separation takes place. On the other hand, it is possible to brake or accelerate the cluster of viscera manually or mechanically in the direction of movement of the surface, or to propel the cluster of viscera in a direction which is different from the direction of movement of the surface, in order to achieve the envisaged separation. It will be clear that the surface can be either flat or have a single curve or multiple curves, while the surface can translate or rotate, or can follow another more complex direction of movement.

In a preferred embodiment of the method according to the invention the surface is formed by the inside of a cylinder which rotates about the central axis thereof running horizontally or at an angle with the horizontal, while the cluster of viscera is placed in the cylinder. The cluster of viscera is carried along in the cylinder on the underside thereof so long as the friction force between the wall of the cylinder and the cluster of viscera can be generated by the force of gravity. When this is no longer the case, the cluster of viscera slides downwards along the wall of the cylinder, possibly simultaneously making tumbling movements. The cluster of viscera in the last-mentioned case can be placed in any desired orientation in the cylinder, with a sufficiently great chance of a piece of visceral tissue to be separated passing into a hole and the envisaged separation taking place.

A piece of visceral tissue to be separated can be retained in a hole in a simple manner by providing the hole with a hooked edge which can easily be passed by the piece of visceral tissue from the surface in a direction at right angles thereto, but which prevents a movement in the opposite direction when the cluster of viscera is moved in the direction of the surface.

In another preferred embodiment the piece of visceral tissue to be separated is retained by holding the piece of visceral tissue by suction against a vacuum suction opening in a wall of the hole into which the piece of visceral tissue to be separated has passed.

For a reduction of the friction of the cluster of viscera over the surface, and in order to prevent undesirable damage to organs, a liquid, for example water, is preferably applied to the surface.

The device according to the invention for carrying out the method according to the invention comprises a surface provided with holes, and means for making the cluster of at least one piece of visceral tissue and at least one organ move relative to and over the surface.

In a preferred embodiment the surface is movable in the plane of the surface by means of a drive.

If a cylindrical drum is selected as the embodiment of the device, the operation of which embodiment has already been described above, an essentially radially inward projecting, helical wall is preferably provided on the inside of the drum. This ensures that clusters of viscera deposited in the drum at one end thereof are conveyed by means of the helical wall to the other end of the drum through the rotary movement of the drum, in which case the envisaged separation takes place, and the clusters of viscera will also be well distributed over the available drum volume. In order to promote the tumbling of clusters of viscera in the drum, the latter is provided with an inward projecting rib running generally in the direction of the axis of the drum at least over a part of the length thereof.

In a preferred embodiment, in which the surface is formed by a flat plate extending in the horizontal direction or at an angle thereto, the plate can be moved to and fro by means of a drive, can be rotated about an axis at right angles to the plate, or can be rotated in such a way that each point of the plate carries out the same circular movement. In another preferred embodiment the surface is flexible and is formed to an endless belt which is passed over two or more rollers connected to a drive. In the abovementioned cases the envisaged separation can be achieved by, for example, keeping the cluster of viscera still relative to the moving plate. However, a barrier, i.e. a stopping or pushing element, is preferably provided above the moving surface, the surface and the barrier being movable relative to each other.

In the device according to the invention the use of a perforated thin plate is preferred, one side of the plate forming the surface of the device. Through a suitable choice of the material and the thickness of the plate, the latter can be formed to a flexible endless belt, for example by using steel or plastic sheeting or film. Instead of a plate, it is also possible to use a gauze with suitable mesh, the mesh of the gauze forming the holes of the surface of the device according to the invention.

For holding a piece of visceral tissue in a hole, the hole is preferably provided with a hooked edge below the level of the surface. In the case of a deep hole the hooked edge can be formed by a continuous or split collar provided in the hole, facing the centre of the hole, and possibly curved away from the surface, which collar may or may not be provided with a sharp inside edge. In the case of a thin plate the edge of the opening of the hole at the side of the plate facing away from the surface acts as the hooked edge, in particular if said edge is relatively sharp. The hook effect here can be increased even further by bending the plate material slightly away from the surface in the region around the hole.

In practice, effective functioning of the device according to the invention can be achieved if the holes have an essentially circular cross-section or the cross-section of a regular polygon. Since the piece of visceral tissue is usually connected by means of connective tissue to an organ which cannot pass the hole opening, it is advantageous to take measures in the hole to catch the connective tissue or visceral tissue. In a preferred embodiment for this purpose the edge of the holes is provided with one or more essentially V-shaped notches. A single V-shaped notch or a small number of V-shaped notches is sufficient if the cluster of viscera is moving in a predetermined direction relative to the surface. If this direction is not known beforehand, the V-shaped notches are, for example, distributed at regular intervals along the edge of the holes.

For a specific selectivity of the device according to the invention all holes in the surface are preferably the same size and shape.

In a special embodiment for separating at least one piece of visceral tissue, such as a spleen, from a liver connected thereto from slaughtered poultry the holes have a circular cross-section with a diameter of approximately 14–20 mm, preferably approximately 17 mm, while the centre-to-centre distance of the holes is approximately 20–40 mm, preferably approximately 24 mm. Such a device also separates adhering fatty residues from the liver, and can therefore also be used for separating pieces of fatty tissue from livers.

Finally, it should be pointed out that the supply of a combination of clusters of viscera and pieces of visceral tissue already separated from each other to a device according to the invention will result in the device acting as a screen for letting through already separated pieces of visceral tissue.

These and other features and advantages of the invention disclosed herein will become more apparent upon consideration of the following detailed description and accompanying drawings wherein like symbols of reference designate corresponding parts.

DETAILED DESCRIPTION OF THE PREFERRED EMBODIMENTS

Figure 1:
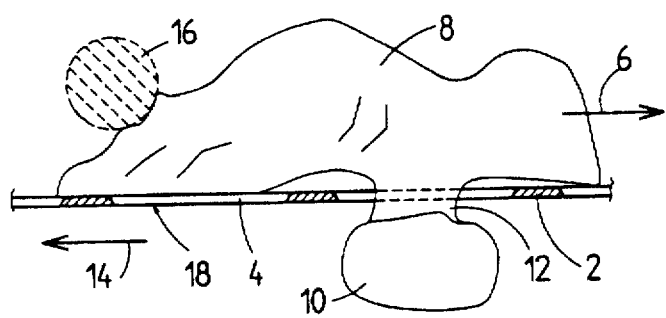
FIG. 1 shows a side view, partially in cross-section, of a cluster of two interconnected organs moving relative to and over a perforated plate.

FIG. 1 shows a thin plate 2 which is provided with holes 4. A cluster formed by a liver 8 and a spleen 10 is moved relative to the stationary plate 2 over the top surface of the plate 2 in the direction of arrow 6. In this case the spleen 10 can pass into a hole 4 of the plate 2, as the figure shows, while the liver 8 cannot pass through a hole 4. Due to the fact that the spleen 10 has passed through the opening of the hole 4, connective tissue 12 is situated in the hole opening. On continued movement of the liver 8 in the direction of the arrow 6, the spleen 10 and a part of the connective tissue 12 will be retained by the edge of the hole 4 in which the connective tissue 12 is situated. The liver 8 will then be torn away from the spleen 10, since the liver-spleen connection is not strong. Instead of moving the liver 8 relative to the stationary plate 2 in the direction of the arrow 6, it is, of course, also possible to move the plate 2, for example in the direction of arrow 14, and in the process keep the cluster of organs 8 and 10 in place, for example by stopping the liver 8 by means of a fixed barrier 16 which is shown by dashed lines. It should be pointed out that moving the cluster of organs 8 and 10 or keeping it still can be carried out either mechanically or manually. The holes 4 of the plate 2 have sharp hooked edges 18 at the underside of the plate, while the edges at the top side of the plate 2 are rounded. The hooked edges 18 catch easily in the connective tissue 12 and ensure a start of tearing.

Instead of the spleen 10, fatty residues of the liver 8 are also found to be separated in the manner shown. In the same way it is also possible to separate fatty residues from a separated spleen 10 by moving the spleen 10 in turn below the plate 2 over a second surface (not shown), which second surface is provided with holes which do not allow through the spleen.

Figure 2:
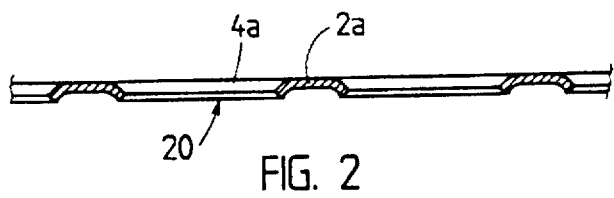
FIG. 2 shows another embodiment of the perforated plate.

In FIG. 2 a hooked edge 20 of a plate 2a is formed by bending over the edge of each opening 4a towards the underside of the plate 2a, while the top side of the plate 2a defines the surface relative to which and over which the cluster of viscera to be processed is moved.

Figure 3:
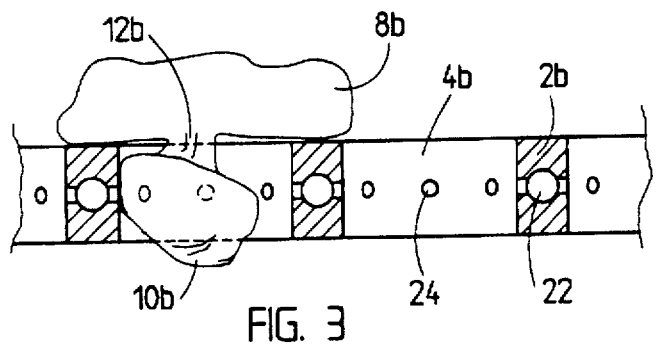
FIG. 3 illustrates yet another embodiment of the plate.

A plate 2b in FIG. 3 is provided with channels 22 which open out at openings 24 in a hole 4b. This means that, by way of example, eight openings 24 open out in each hole 4b. The channels 22 are connected to a vacuum source (not shown in any further detail), as the result of which an organ lob which passes into a hole 4b is held by suction in the hole against one or more of the openings 24. On a subsequent movement of the organ 8b relative to and over the plate 2b, the organs 8b and 10b will be separated from each other through the fact that connective tissue 12b between them tears.

Figure 4:
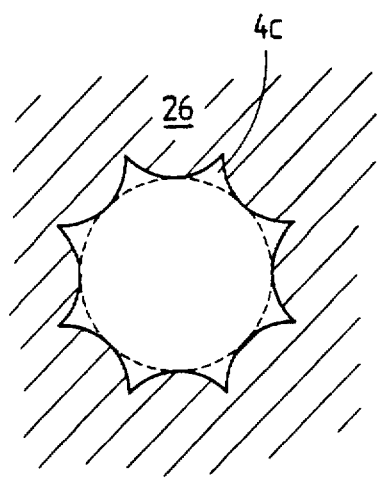
FIG. 4 shows a top view of an embodiment of a hole in a surface.

FIG. 4 shows a hole 4c which is provided along the edge thereof with essentially V-shaped notches, as a result of which an effective hole size remains, shown approximately by the dashed line in the figure. When a cluster of organs 8 and 10 is moved along over surface 26 of the plate illustrated in FIG. 4, and the organ 10 passes into the hole 4c, the connective tissue 12 situated between the organs 8 and 10 will be pulled into one or more of the V-shaped notches of the hole 4c and will become wedged there, as a result of which there is a great certainty of a separation being obtained.

Figure 5:
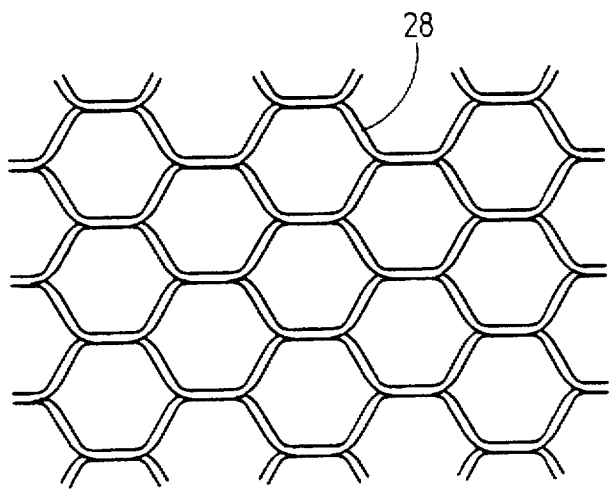
FIG. 5 shows a part of a top view of a gauze.

FIG. 5 illustrates a gauze 28 which can be used instead of a perforated plate and provides the same effective separation operation. Many other embodiments of gauze can be used, provided that they contain holes of a size and shape which are suitable for the envisaged separation.

Figure 6:
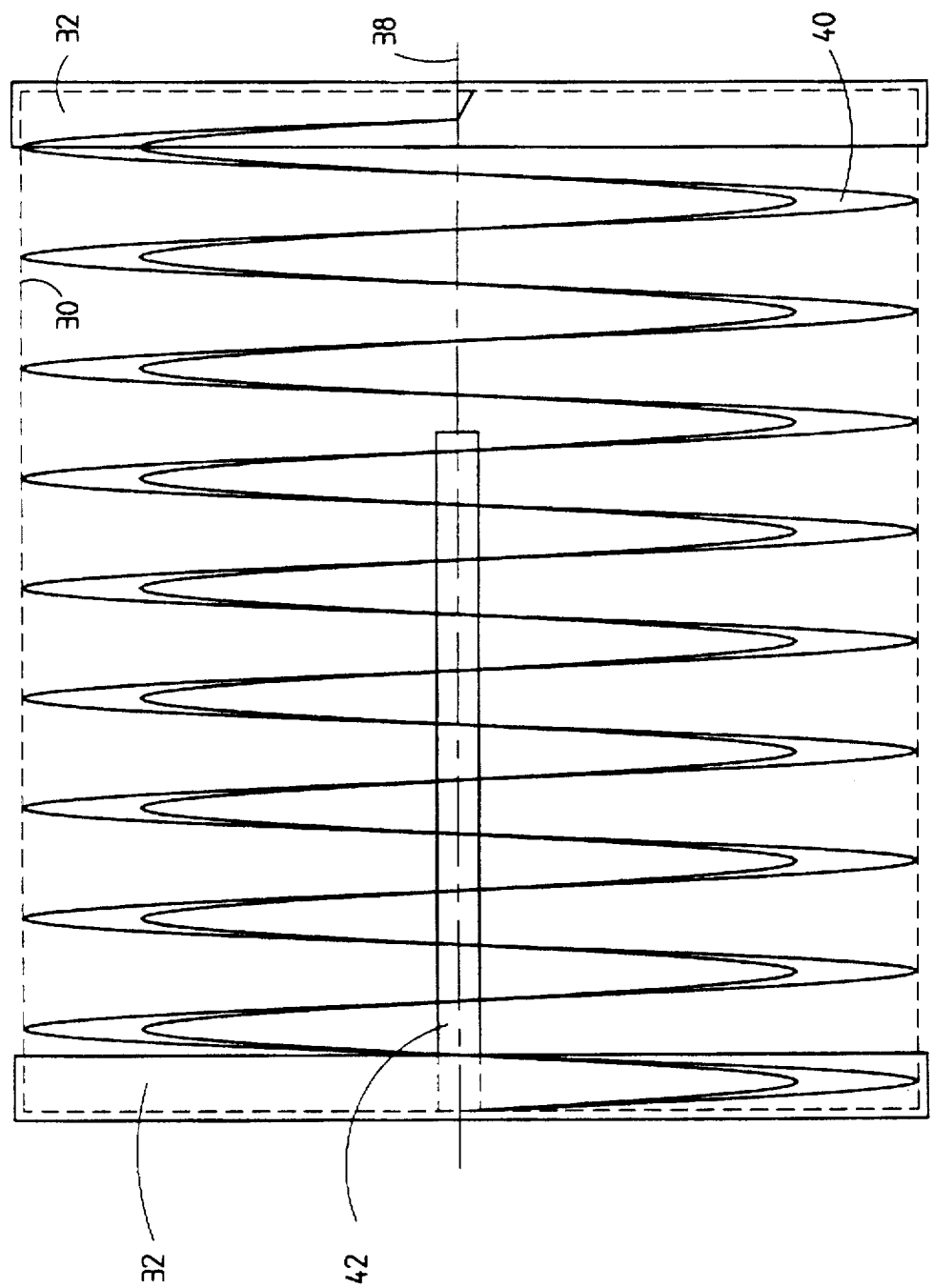
FIG. 6 shows a side view, partially in cross-section, of a first embodiment of a device according to the invention.
Figure 7:
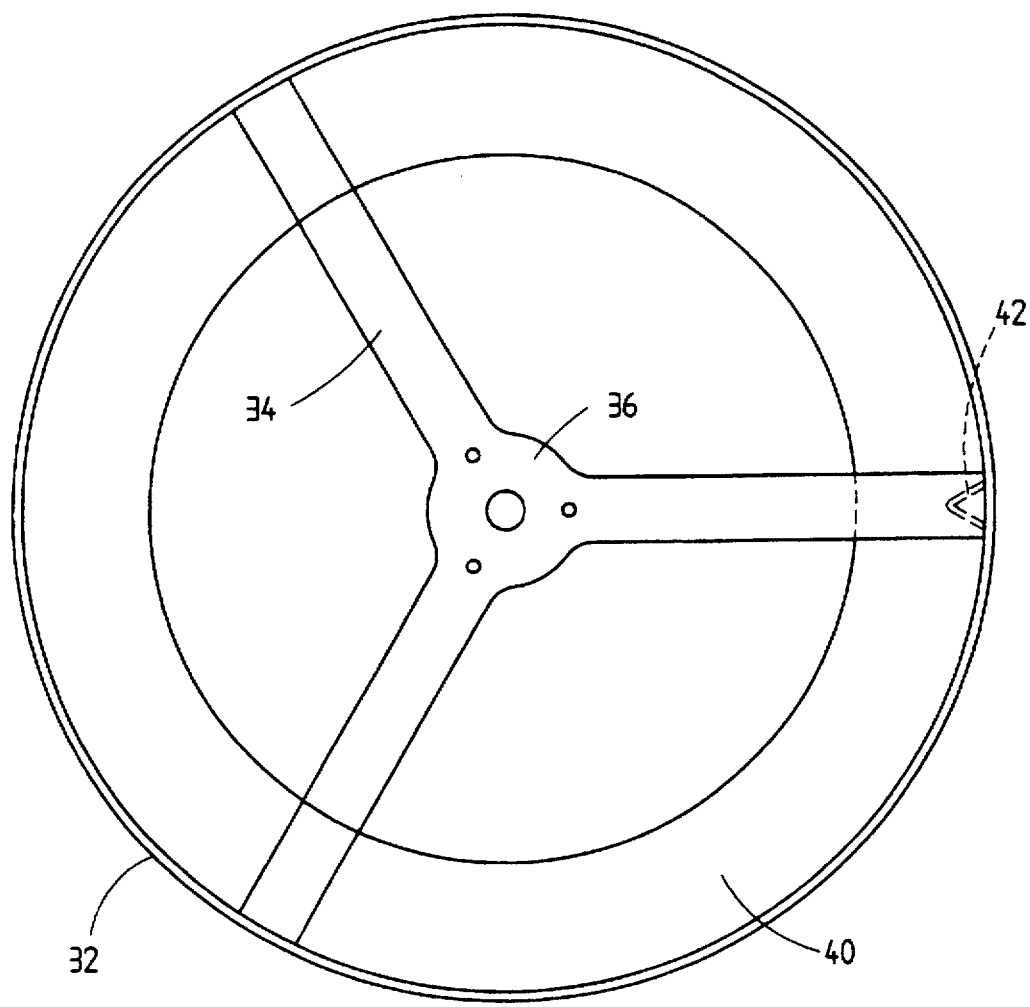
FIG. 7 shows a front view of the device according to FIG. 6.
Figure 8:
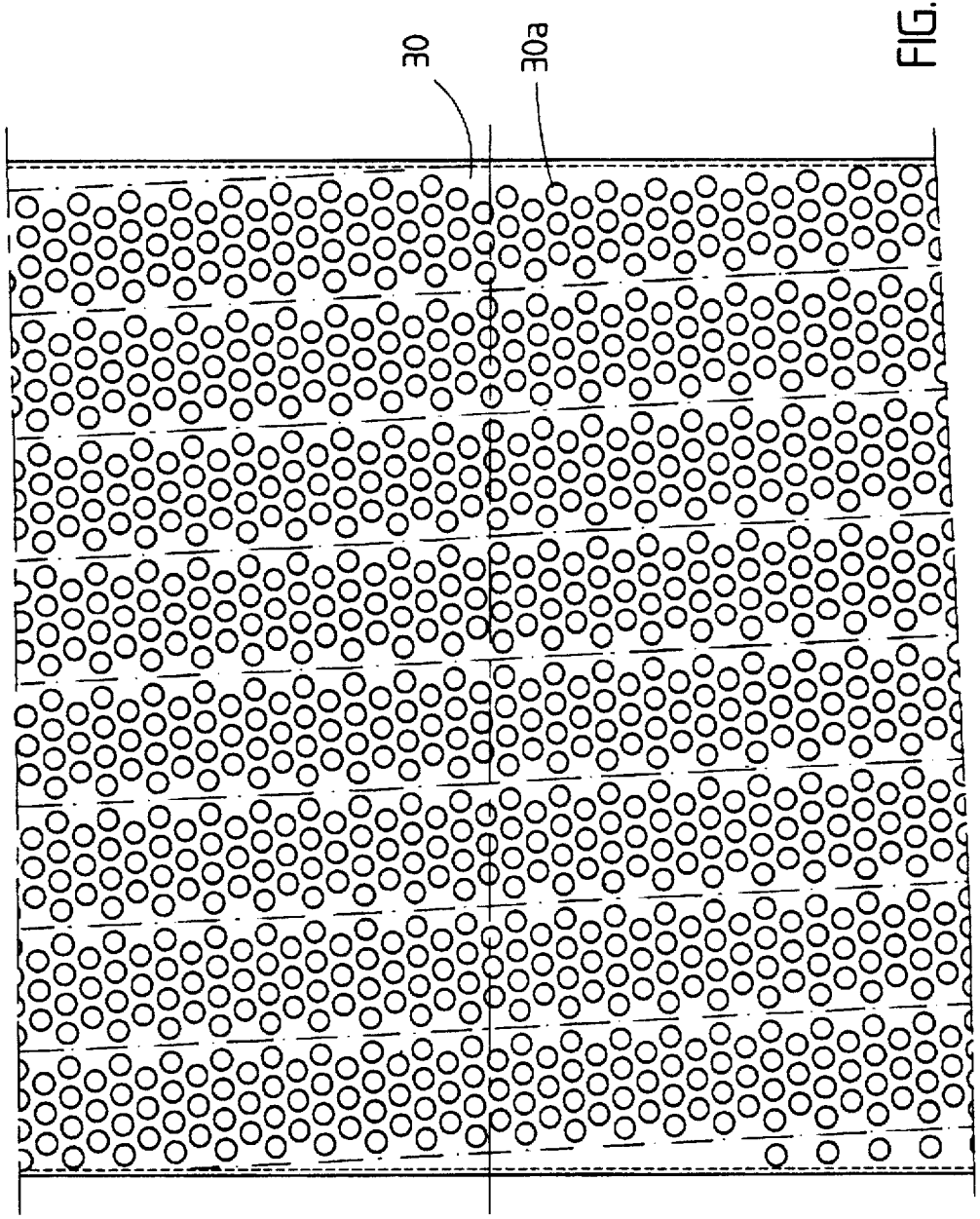
FIG. 8 shows a top view of the surface of the device according to FIG. 6.

FIGS. 6, 7 and 8 show a cylindrical drum of a plate 30 which is provided with holes 30a and at the ends thereof is held between rings 32, each of which is supported by way of three arms 34 at a hub 36. The drum is rotatable by means of a drive (not shown) about an axis 38. An essentially radially inward projecting helical wall 40 is provided on the inside of the drum on the plate 30. A rib 42, projecting towards the inside of the drum and extending in the lengthwise direction of the drum, is also provided on the inside of the plate 30.

The drum works as follows. Clusters of viscers are placed in the drum at one end thereof and fall between two successive threads of the wall 40. The clusters of viscers are transported upwards over some distance by the plate 30 on rotation of the drum, and then tumble downwards along the plate 30. The process of tumbling is reinforced further by the presence of the rib 42. In the meantime the clusters of viscers are conveyed by the wall 40 in the axial direction of the drum. The drum has such dimensions that during the passage of a cluster of viscers there is a likelihood bordering on certainty that the piece of visceral tissue to be separated will pass into an opening 30a of the plate 30, while the piece of visceral tissue concerned is separated from one or more organs in the manner described above. Situated inside or outside the drum is a spray unit (not shown in any further detail) for water, by means of which constant cleaning of the drum is carried out and the friction between organs and visceral tissue and the plate 30 is reduced. If the drum is used for separating a spleen from a liver of slaughtered poultry, the holes 30a in the plate 30 have a diameter of approximately 14–20 mm, preferably approximately 17 mm. In this case the centre-to-centre distance of the holes is approximately 20–40 mm, preferably approximately 24 mm. At the same time as the spleen, fatty tissue will then be separated from the liver.

Figure 9:
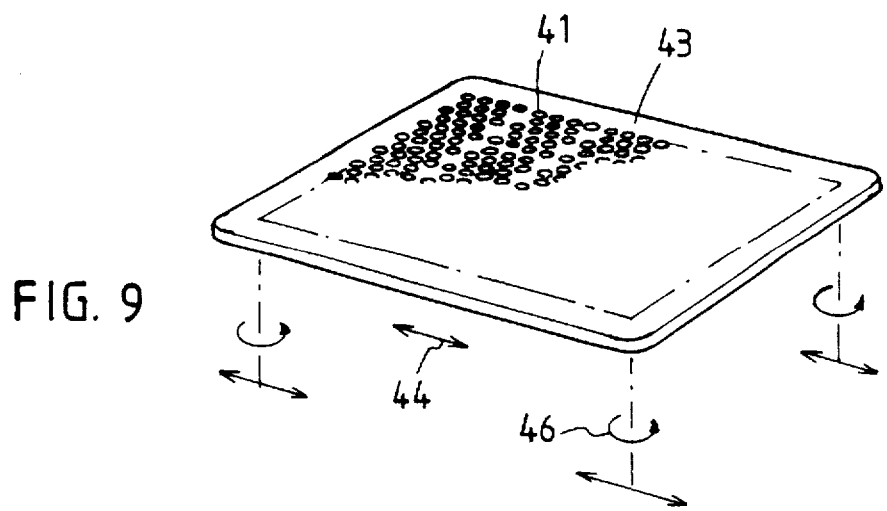
FIG. 9 shows a diagrammatic view in perspective of a second embodiment of the device according to the invention.

FIG. 9 shows a separating device which is in the form of a flat plate 43 which is provided with holes 41 and which can move, for example, to and fro by means of a drive (not shown in any further detail) in the directions of double arrows 44. The plate 43 can also be rotated by means of a drive (not shown) in such a way that each point of the plate carries out a circular movement, as shown by arrows 46.

Figure 10:
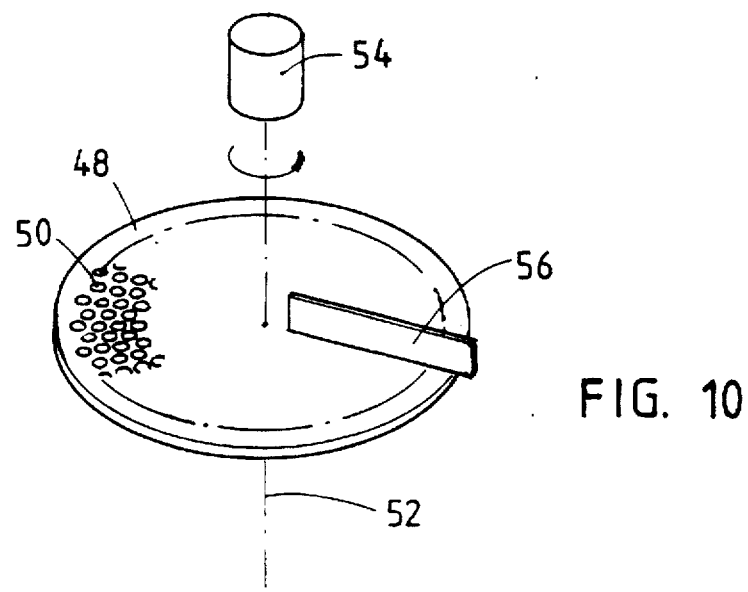
FIG. 10 shows a diagrammatic view in perspective of a third embodiment of the device according to the invention.

According to FIG. 10, a circular plate 48 with holes 50 is rotated about an axis 52 by means of a drive 54. A barrier 56 is disposed above the plate 48. Clusters of viscera are deposited on the plate 48 near the centre of the plate. These clusters will move against the barrier 56 through the rotation of the plate 48 and will consequently be stopped, and will slowly move to the outer periphery of the plate 48. In the meantime, there is sufficient chance that the piece of visceral tissue to be separated will pass into a hole 50.

Figure 11:
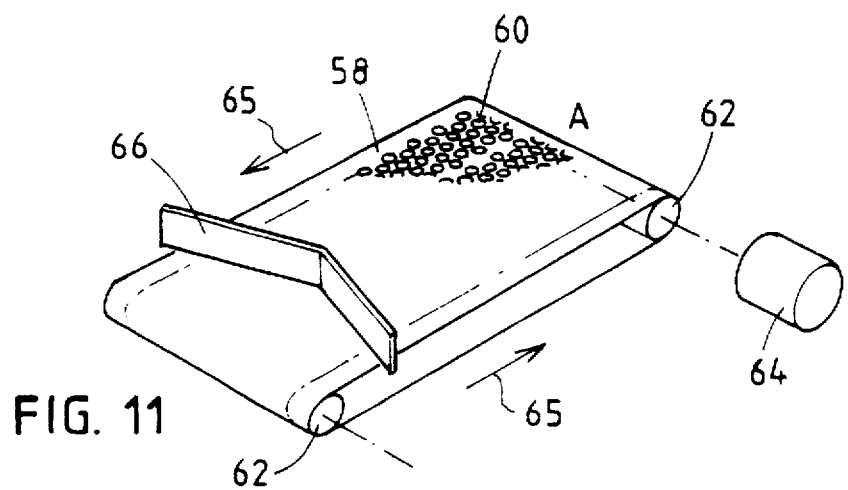
FIG. 11 shows a diagrammatic view in perspective of a fourth embodiment of the device according to the invention.

In FIG. 11 the separation device according to the invention contains a flexible plate 58 with holes 60. The plate is formed to an endless belt which extends around two rollers 62, one of which is driven by a drive 64, so that the belt moves in the direction of arrows 65. A curved barrier 66 is provided above the plate 58. When clusters of viscera are deposited at the place indicated by A on the moving plate 58, these clusters will be conveyed to the barrier 66 and detained by the latter. The clusters will subsequently be moved gradually to the side of the plate 58, due to the curved shape of barrier 66, and the envisaged separation takes place.

It is to be understood that the inventive concept is not limited to the embodiments described above, since the invention may take other forms.

What is claimed is:

1. A method for separating at least one piece of visceral tissue from at least one organ connected thereto, in which the at least one piece of visceral tissue to be separated is smaller than said at least one organ, wherein the method comprises the step of:

providing a surface with holes, which holes are effectively at least as large as the smallest cross-section of the at least one piece of visceral tissue to be separated;

moving the cluster of at least one piece of visceral tissue and the at least one organ relative to and over the surface to cause the piece of visceral tissue to pass into and be retained by one of the holes; and Separating the retained visceral tissue and organ.

2. A method according to claim 1 further comprising the step of placing the cluster on a surface which is moved in the direction of the plane thereof.

3. A method according to claim 2, wherein the surface extends in the horizontal direction or at an angle thereto, and further comprising the step of exerting an external force on the at least one organ, in order to make the at least one organ move relative to and over the surface.

4. A method according to claim 2, wherein the surface is formed by the inside of a cylinder which rotates about the central axis thereof running horizontally or at an angle with the horizontal, while the cluster is placed in the cylinder.

5. A method according to claim 1, further comprising the step of retaining a piece of visceral tissue to be separated behind a hooked edge of the hole into which the piece of visceral tissue to be separated has passed.

6. A method according to claim 1 further comprising the step of retaining a piece of visceral tissue by suction against a vacuum suction opening in a wall of the hole in which the piece of visceral tissue to be separated has passed.

7. A method according to claim 1, further comprising the step of applying a liquid to the surface.

8. A method according to claim 7, wherein the liquid is essentially water.

9. A device for separating at least one piece of visceral tissue from at least one organ connected thereto, in which the at least one piece of visceral tissue to be separated is smaller than the at least one organ, the device comprising:

a surface provided with holes, which holes are effectively at least as large as the smallest cross-section of the at least one piece of visceral tissue to be separated; and means for making the cluster of at least one piece of visceral tissue and at least one organ move relative to and over the surface.

10. A device according to claim 9, wherein the surface is movable in the plane of the surface by means of a drive.

11. A device according to claim 9, wherein the surface 15 is formed by the inside of a cylindrical drum which is rotatable about the central axis of the drum running horizontally or at an angle with the horizontal.

12. A device according to claim 11, wherein an essentially radially inward projecting, helical wall is provided on the inside of the drum.

13. A device according to claim 11, wherein an inward projecting rib is provided on the inside of the drum, running generally in the direction of the axis of the drum at least over a part of the length thereof.

14. A device for separating at least one piece of visceral tissue from at least one organ connected thereto, in which the at least one piece of visceral tissue to be separated is smaller than the at least one organ, the device comprising:

a surface provided with holes, which holes are effective to retain the at least one of visceral tissue to be separated, wherein the surface is (1) formed by a flat plate extending in the horizontal direction or at an angle thereto and (2) movable in the plane of the surface by means of a drive; and means for making the cluster of at least one piece of visceral tissue and at least one organ move relative to and over the surface.

15. A device according to claim 14, wherein the plate is connected to a drive for moving the plate to and fro.

16. A device according to claim 14, wherein the plate is connected to a drive for rotating the plate about an axis at right angles to the plate.

17. A device according to claim 14, wherein the plate is connected to a drive for rotating the plate in such a way that each point of the plate carries out the same circular movement.

18. A device according to claim 10, wherein the surface is flexible and is formed to an endless belt which is passed over two or more rollers connected to a drive.

19. A device according to claim 14, wherein a barrier is provided above the surface, the surface and the barrier being movable relative to each other.

20. A device according to claim 9, wherein the surface is formed by a perforated thin plate.

21. A device according to claim 9, wherein the surface is formed by a gauze.

22. A device according to claim 9, wherein the hole is provided with a hooked edge below the level of the surface.

23. A device according to claim 9, wherein the hole in the wall thereof is provided with one or more vacuum suction openings below the level of the surface.

24. A device according to claim 9, wherein the holes have an essentially circular cross-section or the cross-section of a regular polygon.

25. A device according to claim 9, wherein the edge of the holes is provided with one or more essentially V-shaped notches.

26. A device according to claim 9, wherein all holes in the surface are the same size and shape.

27. A device according to claim 24 for separating at least one piece of visceral tissue, such as a spleen or fatty tissue, from a liver connected thereto of slaughtered poultry, wherein the holes have a circular cross-section with a diameter of approximately 14–20 mm, preferably approximately 17 mm.

28. A device according to claim 27, wherein the centre-to-centre distance of the holes is approximately 20–40 mm, preferably approximately 24 mm.

29. A device comprising:

a surface provided with means for retaining at least one piece of visceral tissue; and means for separating the at least one piece of visceral tissue from at least one organ connected thereto, in which the at least one piece of visceral tissue to be separated is smaller than the at least one organ, wherein the separating means comprises means for moving the at least one piece of visceral tissue and the at least one organ relative to the surface and wherein the moving means is selected from the group consisting of:

a cylindrical drum that is rotatable about the central axis of the drum;

a cylindrical drum, whose inside surface comprises an essentially radially inward protecting, helical wall, wherein the drum is rotatable about the central axis of the drum;

a drive for moving a flat plate; and an endless belt which is passed over two or more rollers connected to a drive.

30. A device according to claim 29, wherein the surface is selected from the group consisting of: a plate; a gauze; and an endless belt.

31. A device according to claim 30, wherein the plate is thin.

32. A device according to claim 30, wherein the plate is flat.

* * * * *

UNITED STATES PATENT AND TRADEMARK OFFICE
CERTIFICATE OF CORRECTION

PATENT NO. : 5,755,617
DATED : May 26, 1998
INVENTOR(S) : Cornelis D. van Harskamp, Adrianus J. van den Nieuwelaar and Engelbert J. J. Teurlinx It is certified that error appears in the above-identified patent and that said Letters Patent is hereby corrected as shown below:

Column 5, line 21, delete "1ob" and insert --10b--

Column 7, line 25, claim 11, delete "15"

Signed and Sealed this

Fifth Day of September, 2000

Attest:

Q. TODD DICKINSON

*Attesting Officer*     *Director of Patents and Trademarks*